Jan. 11, 1949.      R. P. MESSENGER      2,458,790
BEET TOPPER
Filed July 10, 1944                    2 Sheets-Sheet 1
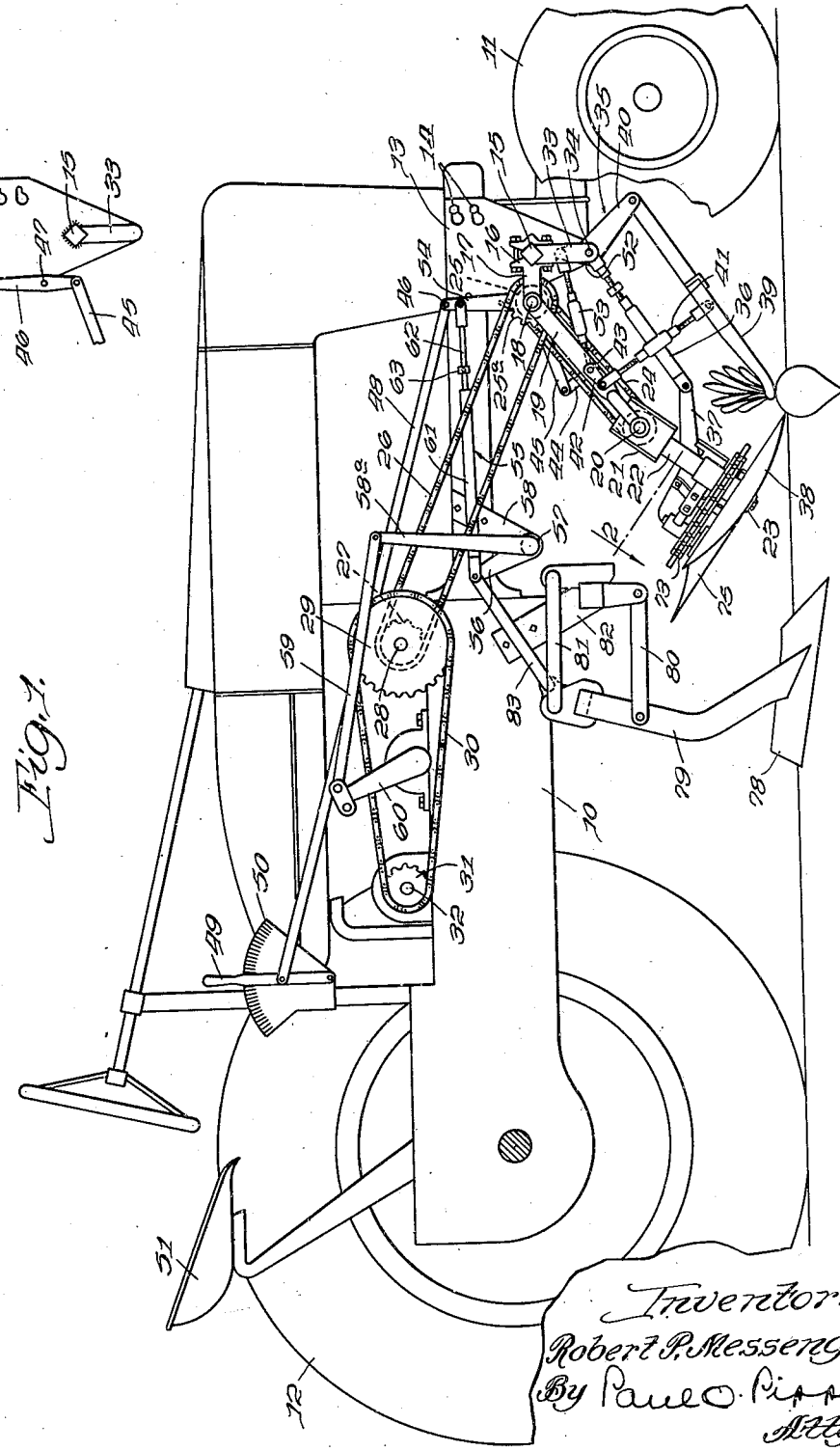
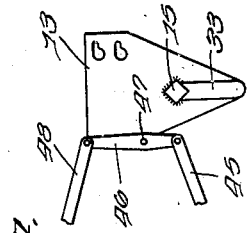
Inventor:
Robert P. Messenger.
By Paul O. Pippel
Atty.

Jan. 11, 1949.　　　R. P. MESSENGER　　　2,458,790
BEET TOPPER
Filed July 10, 1944　　　　　　　　　2 Sheets-Sheet 2
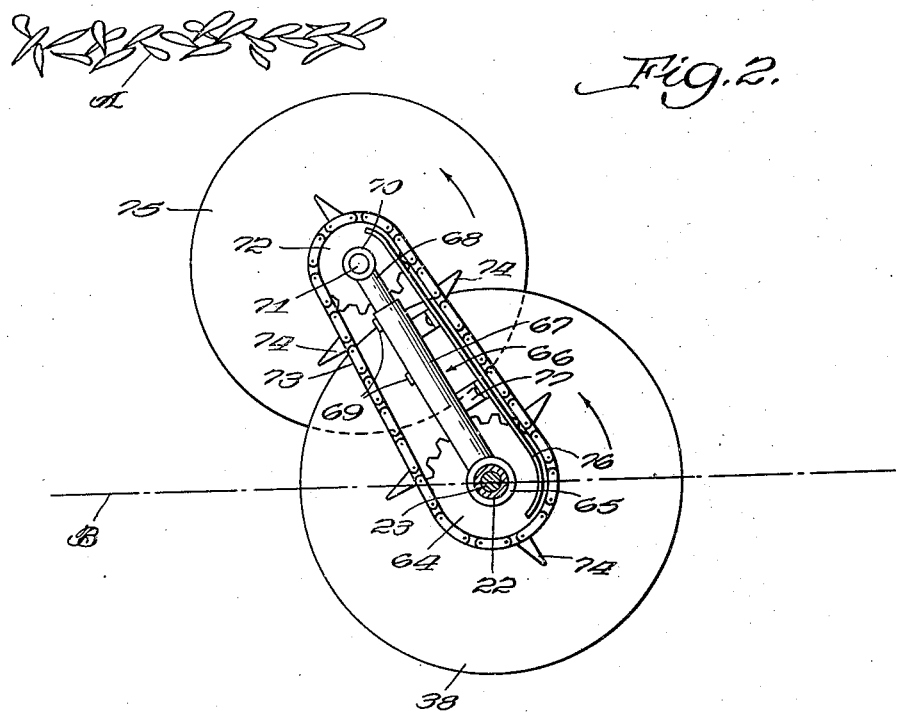
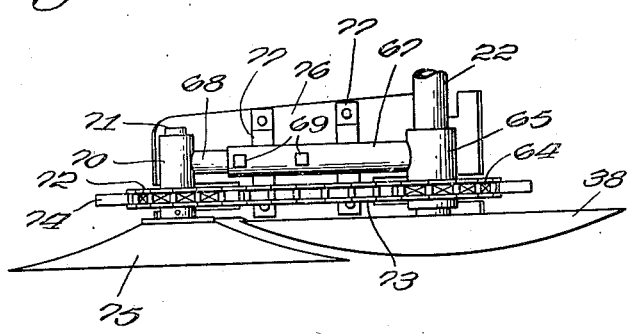
Inventor:
Robert P. Messenger
By Paul O. Pippel
Atty.

Patented Jan. 11, 1949

2,458,790

UNITED STATES PATENT OFFICE 2,458,790

BEET TOPPER

Robert P. Messenger, Kenilworth, Ill., assignor to International Harvester Company, a corporation of New Jersey Application July 10, 1944, Serial No. 544,215

8 Claims. (Cl. 55—107)

This invention relates to topping mechanism for beets and the like.

An object of the invention is to provide improved means for discharging the severed vegetation from the topping mechanism.

Another object is to provide in a topping mechanism for beets and the like, means for depositing the beet tops in a row instead of scattering them, thus facilitating their final removal.

Another object is to provide in a topping and digging mechanism for beets and the like utilized in conjunction with loading mechanism for the beets, means for depositing the several vegetation at a sufficient distance laterally of the row to prevent its being taken up by the loading mechanism.

A further object is to provide, in a topping mechanism for beets and the like, a rotary disk for receiving and discharging the beet tops severed by the topping mechanism.

A still further object is to provide, in combination with a rotary cutting disk for topping beets and the like, a second disk of generally frusto-conical shape for receiving beet tops from the topping disk, and means for revolving the second disk at a rate at least equal to that of the cutting disk, in order to deposit the severed tops at a suitable distance from the topping mechanism.

Other objects and advantages will become apparent from the following detailed description when read in conjunction with the accompanying drawings, wherein:

Figure 1 is a view in side elevation of a tractor having the topping mechanism of the present invention mounted thereupon;

Figure 2 is an enlarged view taken along the line 2 of Figure 1;

Figure 3 is an elevation of the structure shown in Figure 2, illustrating the relationship of the topping disk to the flinger disk; and Figure 4 is a detail of the adjusting mechanism.

The topping mechanism of the present invention is adapted to be mounted upon a tractor to be lifted thereby, and to have a certain amount of floating movement in its ground-working position, in order to properly top beets of varying sizes, and which project varying distances above the surface of the ground. It is likewise utilized in conjunction with a digger device for removing the beets from the ground and depositing them upon the surface thereof.

It will be noted that the topper of the present invention is mounted upon a tractor having a longitudinally extending body 10, front wheels 11, and rear drive wheels 12, one of which is removed for clarity. At the side of the tractor and adjacent the forward end thereof is a generally triangular plate 13 removably secured to the tractor body by bolts 14. Extending laterally from plate 13 is a tool bar 15 having one or more brackets 16 clamped thereto. Bracket 16 is provided with a rearwardly extending arm 17 in the end of which is journaled a transverse shaft 18 having secured thereto a downwardly and rearwardly extending link 19 supporting at the end thereof a shaft 20. Pivoted upon shaft 20 is a gear box 21 from which extends a sleeve member 22 enclosing a rotary shaft 23.

Gear box 21 encloses gears, not shown, drivingly connected by a chain 24 to a sprocket wheel 25 keyed to shaft 18. Another sprocket wheel 25a is connected by a chain 26 to a sprocket wheel 27, keyed to a shaft 28, mounted upon the tractor. Likewise secured to shaft 28 is a sprocket 29, connected by a chain 30 to a sprocket wheel 31, keyed to a shaft 32 mounted upon the tractor and driven therefrom in a manner not shown. Drive is thus transmitted through sprocket wheels 31, 29, 27, and 25 to the shaft 23, for a purpose hereinafter to be set forth.

Depending from tool bar 15 is a hanger 33, the lower end of which is apertured to rotatably receive a shaft 34 upon which is mounted a bell-crank 35. Likewise pivoted on shaft 34 is a rearwardly extending adjustable link 36, the rear end of which is pivoted upon a member 37 secured to the sleeve 22. It should now be clear that links 19 and 36 have a somewhat non-parallel relation and serve to support the rotary shaft 23 upon the tractor.

It should be noted here that the linkage just described, comprising non-parallel links 19 and 36 by which the rotary shaft 23 is pivotally supported on the tractor for vertical movement with respect thereto, forms no part of the present invention. For a fuller disclosure of the details thereof, reference may be had to copending United States application Serial No. 544,200 dated July 10, 1944.

Secured to the lower end of shaft 23 is a concavo-convex topping disk 38 having a cutting edge for severing the tops from the beets. The relationship of the topping disk 38 to a beet having a crown and foliage projecting above the ground is shown clearly in Figure 1. When topping a beet which extends slightly above the ground, it is desirable that the topping disk 38 remove only a relatively thin crown from the beet. On the other hand, larger beets which project higher above the ground require a thicker crown to be removed therefrom. Therefore, in order to gauge properly the amount of beet to be severed by the disk 38, a finder mechanism 39 is provided. Finder mechanism 39 is generally parallel to the links 19 and 36 and is pivoted at its forward end upon an arm 40 of bell-crank 35. Likewise connected to finder 39 is an adjustable link 41, pivoted at its upper end upon a crank arm 42 secured to the end of a shaft 43, journaled in the link 19, and provided at its opposite end with a crank arm 44, connected by link 45 to the lower end of a lever 46, pivoted at 47 upon the plate 13 (see Fig. 4). The upper end of lever 46 is connected by a rod 48 with a hand lever 49 pivoted upon a quadrant 50 mounted upon the tractor within easy access of an operator from his seat 51. Thus, by manipulating the lever 49 and rocking lever 46, which in turn rocks crank arms 44 and 42, the finder 39 may be vertically adjusted with respect to the disk 38.

Likewise secured to the other arm 52 of bell-crank 35 is an adjustable link 53, the other end of which is pivoted upon the shaft 43.

It will be noted that due to the non-parallelism of links 19 and 36, these links will move in different arcs so that sleeve 22, enclosing rotary shaft 23, will change its angle when links 19 and 36 swing vertically with the variation in the height of the beets to be topped, or when the topping mechanism is moved to and from ground-working position. Likewise, due to the fact that the finder 39 is longer than links 19 and 36 and is pivoted upon the bell-crank arm 40 and that bell-crank 35 is rocked upon vertical movement of the topping mechanism, finder 39 will move vertically at a different rate from that of the disk 38, and will move in a substantially straight line instead of following an arcuate path. Thus when the topping mechanism moves upwardly to top a larger beet than that shown in Figure 1, the distance between the rear end of the finder and the forward edge of disk 38 will increase, so that a thicker portion of the crown of larger beets may be topped, and insure removal of all the foliage therefrom.

Raising and lowering of the topper is accomplished by a mechanism including an arm 54 secured to the inner end of shaft 18 and having its upper end connected by a telescoping member 55 to an arm 56 secured to a shaft 57 mounted in a bracket 58 bolted to the tractor. Another arm 58a secured to the shaft 57 is connected at its upper end by a rod 59 to a rock arm 60 mounted on the tractor for forward and rearward rocking movement, and powered from a source not shown. It will be noted that the telescoping member 55 comprises a sleeve 61 and a shaft 62 having a collar 63 adjustable thereon. Raising of the topping mechanism from the ground is accomplished by forward rocking movement of rock arm 60, which in turn rocks arms 56 and 58 and causes sleeve 61 to abut collar 63, whereupon shaft 18 is rocked by the implement raised from the ground. Floating movement of the topping mechanism in ground-working position is permitted within the limits defined by the spacing of collar 63 from the end of sleeve 61.

Referring now particularly to Figures 2 and 3, shaft 23, at a point above disk 38, is provided with a sprocket wheel 64. Also mounted upon sleeve 22 is a bushing 65 to which is secured a laterally and rearwardly extending telescoping member 66, comprising a sleeve 67 and a shaft 68, adjustable by set screws 69. The rear end of shaft 68 is provided with a bearing 70, in which is rotatably mounted a stub shaft 71, parallel to shaft 23. Keyed to shaft 71 is a sprocket wheel 72, and trained around sprockets 64 and 72 is a drive chain 73, provided at intervals with outwardly projecting paddle members 74. To the lower end of stub shaft 71 is secured a finger disk 75 which, as will be noted particularly well in Figure 3, in the embodiment shown is generally frusto-conical in shape and flared outwardly at its base. Disk 38 is rotated with shaft 23 in the direction of the arrows in Figure 2, and by virtue of the sprocket and chain connection therebetween, disk 75 is rotated in the same direction as the disk 38.

Upon disk 38 severing the tops from the beets, the vegetation is carried in a counter-clockwise direction with the disk 38 until it encounters the chain 73, whereupon the tops are fed rearwardly to finger disk 75 by the paddle members 74. The beet tops are prevented from continuing with the rotation of disk 38 by contact with a shield 76 secured to telescoping member 66 by straps 77. It will be noted in Figure 2 that the sprocket 72 is somewhat smaller than sprocket 64, so that disk 75 is rotated at a somewhat higher rate than disk 38. Upon discharge of the tops from cutting disk 38 upon disk 75, therefore, the beet tops are flung laterally away from the topping mechanism and deposited in a row, as indicated by the letter A. The center of the row of beets to be topped is indicated by the letter B.

The speed at which disk 75 is rotated with respect to disk 38 may be varied, of course, by any suitable means, such as variation in size of the sprocket wheels 72 and 64. However, for best results disk 75 should be revolved at a rate at least equal to that of disk 38, and preferably at a slightly greater speed.

From the foregoing it should be understood that a novel mechanism for topping beets and the like, and for depositing the severed tops in a row at a suitable distance from the topping mechanism, has been provided. This is particularly important when the topping mechanism is utilized in conjunction with digging mechanism for removing the beets from the ground and the like. Such a digging mechanism and its relationship to the topping mechanism is shown in Figure 1, and includes digger blades 78, supported by a standard 79, and pivotally connected by parallel links 80 and 81 to a bracket 82 bolted to the tractor body. Another link 83 connects the standard 79 with arm 56, so that upon rocking arm 58 to raise and lower the topping mechanism, the digger mechanism is likewise raised.

Having now described the invention in its preferred embodiment, it should be understood that variations may be made therein without departing from the spirit of the invention or the scope of the appended claims.

What is claimed is:

1. In a topping mechanism for beets and the like, in combination, a support, linkage pivoted on the support for vertical swinging movement, a cutting disk rotatable on an upwardly extending axis carried by the linkage for severing the beet tops, a second disk rotatable on an axis generally parallel to the first-mentioned axis for receiving the beet tops discharged from the first-mentioned disk, means for driving the second disk from the first disk, including means for driving said second disk at a higher rate than said first disk, and means associated with said drive means for guiding the tops from said first disk to said second disk.

2. In a topping mechanism for beets and the like, in combination, a support, linkage pivoted on the support for vertical swinging movement, a cutting disk rotatable on an upwardly extending axis carried by the linkage for severing the beet tops, a second disk rotatable on an axis generally parallel to the first-mentioned axis for receiving the beet tops discharged from the first-mentioned disk, common drive means for said disks, including means for driving said second disk at a higher rate than said first disk, means for guiding the tops from said first disk to said second disk, said last-mentioned means comprising an endless chain drivingly connecting said axes, paddles on said chain, and a shield plate between said axes.

3. In a topping mechanism for beets and the like, in combination, a support, linkage pivoted on the support for vertical swinging movement, a cutting disk rotatable on an upwardly extending axis carried by the linkage for severing the beet tops, a second rotatable disk in underlapping relation to the first-mentioned disk adapted to receive the beet tops discharged from the first disk, means serving as a shield between said disks for preventing the beet tops from rotating with the first disk, and traveling conveyor means between said disks for directing the beet tops from the first disk to the second disk.

4. In a topping mechanism for beets and the like, the combination with a support of a concavo-convex cutting disk for severing the beet tops, means mounting the cutting disk on the support for movement to and from earth-working position, means on the support for rotating the cutting disk, a generally frusto-conical flinger disk mounted on the support adjacent the cutting disk at a location laterally spaced from the contact point of the cutting disk with the beet and mounted for rotation on an axis generally parallel to the axis thereof for receiving and discharging the vegetation discharged from the cutting disk, and means on the support for rotating the flinger disk in the same direction as the cutting disk.

5. In a topping mechanism for beets and the like, the combination with a support of a concavo-convex cutting disk for severing the beet tops, means mounting the cutting disk on the support for movement to and from earth-working position, means on the support for rotating the cutting disk on an upwardly extending axis, a generally frusto-conical flinger disk mounted on the support adjacent the cutting disk at a location laterally spaced from the contact point of the cutting disk with the beet and mounted for rotation on an axis generally parallel to the axis thereof for receiving and discharging the vegetation discharged therefrom, and means on the support for rotating the flinger disk.

6. In a topping mechanism for beets and the like, the combination with a support of a concavo-convex cutting disk for severing the beet tops, means mounting the cutting disk on the support for movement to and from earth-working position, means on the support for rotating the cutting disk on an upwardly extending axis, a generally frusto-conical flinger disk mounted on the support adjacent the cutting disk at a location laterally spaced from the contact point of the cutting disk with the beet and mounted for rotation on an axis generally parallel to the axis thereof for receiving and discharging the vegetation discharged therefrom, means on the support for rotating the flinger disk, and means associated with the cutting disk for transferring the vegetation from the cutting disk to the flinger disk.

7. In a topping mechanism for beets and the like, in combination, a traveling support, rearwardly and downwardly extending linkage pivoted at its forward end on the support for vertical floating movement and to be raised and lowered with respect to the support, a concave-convex rotary cutting disk carried by the linkage for severing the beet tops, a generally frusto-conical flinger disk rotatable about an axis laterally removed from the axis of the cutting disk and having a flared base in underlapping relation with the cutting disk, means on the support for rotating said disks in the same direction, and means associated with the cutting disk for discharging the beet tops severed by the cutting disk upon the flinger disk.

8. In a topping mechanism for beets and the like, in combination, a traveling support, rearwardly and downwardly extending linkage pivoted at its forward end on the support for vertical floating movement and to be raised and lowered with respect to the support, a downwardly and rearwardly extending shaft structure carried by said linkage, a cutting disk for severing beet tops carried by said shaft structure for rotation about the axis thereof, a frame carried by said shaft structure and extending laterally and rearwardly therefrom, a flinger disk carried by said frame adjacent the end thereof for rotation about an axis generally parallel to the axis of said shaft structure, means for transferring the severed beet tops from the cutting disk to the flinger disk, and means for driving the flinger disk from the cutting disk shaft.

ROBERT P. MESSENGER.

REFERENCES CITED

The following references are of record in the file of this patent:

UNITED STATES PATENTS

| Number | Name | Date |
|---|---|---|
| Re. 12,708 | Heilig | Oct. 29, 1907 |

FOREIGN PATENTS

| Number | Country | Date |
|---|---|---|
| 306,761 | Germany | July 11, 1918 |
| 225,738 | Great Britain | Dec. 11, 1924 |